US011727003B2

(12) United States Patent
Saxena et al.

(10) Patent No.: US 11,727,003 B2
(45) Date of Patent: Aug. 15, 2023

(54) SCALING QUERY PROCESSING RESOURCES FOR EFFICIENT UTILIZATION AND PERFORMANCE

(71) Applicant: Amazon Technologies, Inc., Seattle, WA (US)

(72) Inventors: Gaurav Saxena, Cupertino, CA (US); Balakrishnan Narayanaswamy, San Jose, CA (US); Ippokratis Pandis, Menlo Park, CA (US); Naresh Chainani, Mountain View, CA (US); Mohammad Rezaur Rahman, Fremont, CA (US); Davide Pagano, Watsonville, CA (US); Fabian Oliver Nagel, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/547,831

(22) Filed: Dec. 10, 2021

(65) Prior Publication Data
US 2023/0169079 A1 Jun. 1, 2023

Related U.S. Application Data

(60) Provisional application No. 63/283,402, filed on Nov. 26, 2021.

(51) Int. Cl.
*G06F 16/245* (2019.01)
*G06F 16/2453* (2019.01)
(52) U.S. Cl.
CPC .. *G06F 16/24545* (2019.01); *G06F 16/24537* (2019.01)

(58) Field of Classification Search
CPC ............... G06F 16/24545; G06F 16/24537
See application file for complete search history.

(56) References Cited

U.S. PATENT DOCUMENTS

| 9,270,521 | B2 | 2/2016 | Tompkins |
| 9,391,902 | B2 * | 7/2016 | Eliáš ................ G06F 16/24537 |
| 10,223,417 | B1 * | 3/2019 | Sirin ................ G06F 16/24542 |
| 10,229,158 | B2 | 3/2019 | Belknap et al. |
| 10,303,688 | B1 * | 5/2019 | Sirin ................ G06F 16/2458 |
| 10,922,371 | B2 | 2/2021 | Yi et al. |
| 2018/0203744 | A1 | 7/2018 | Wiesmaier et al. |

(Continued)

OTHER PUBLICATIONS

U.S. Appl. No. 17/535,940, filed Nov. 26, 2021, Ippokratis Pandis.
(Continued)

*Primary Examiner* — Baoquoc N To
(74) *Attorney, Agent, or Firm* — S. Scott Foster; Kowert, Hood, Munyon, Rankin & Goetzel, P.C.

(57) ABSTRACT

Scaling of query processing resources for efficient utilization and performance is implemented for a database service. A query is received via a network endpoint associated with a database managed by a database service. Respective response times predicted for the query using different query processing configurations available to perform the query are determined. Those query processing configurations with response times that exceed a variability threshold determined for the query may be excluded. A remaining query processing configuration may then be selected to perform the query.

20 Claims, 8 Drawing Sheets

(56) References Cited

U.S. PATENT DOCUMENTS

2019/0384863 A1* 12/2019 Sirin .................. G06V 10/776
2020/0067789 A1    2/2020 Khuti et al.

OTHER PUBLICATIONS

U.S. Appl. No. 17/535,446, filed Nov. 24, 2021, Ippokratis Pandis.
U.S. Appl. No. 17/489,532, filed Sep. 29, 2021, Ippokratis Pandis, et al.

* cited by examiner

SCALING QUERY PROCESSING RESOURCES FOR EFFICIENT UTILIZATION AND PERFORMANCE

RELATED APPLICATIONS

This application claims benefit of priority to U.S. Provisional Application Ser. No. 63/283,402, entitled "SCALING QUERY PROCESSING RESOURCES FOR EFFICIENT UTILIZATION AND PERFORMANCE," filed Nov. 26, 2021, and which is incorporated herein by reference in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. However, given that many workloads are unknown when data processing resources are configured, or change over time. Challenges in obtaining the right configuration of data processing resources occur frequently.

Figure 1:
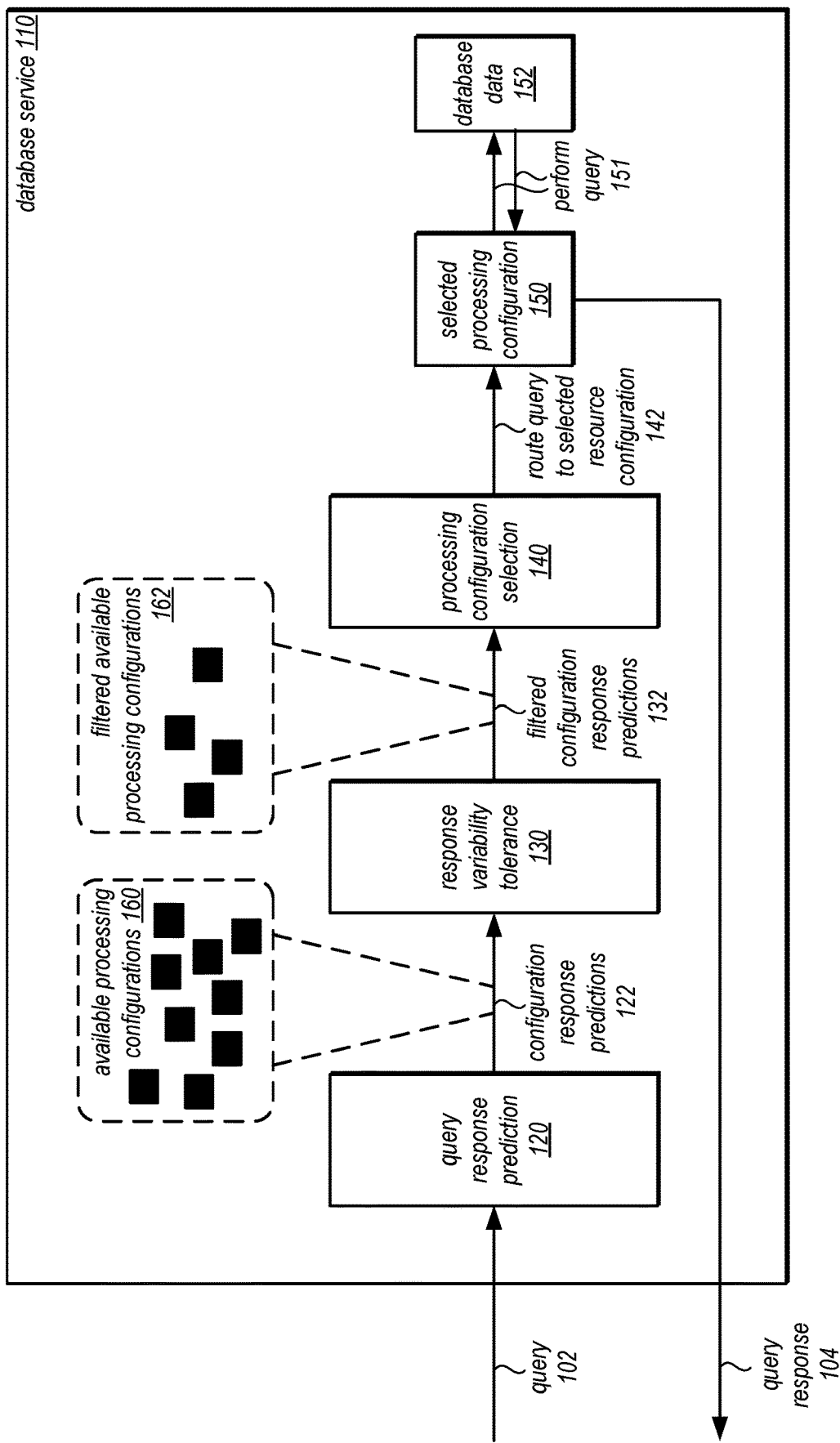
FIG. 1 illustrates a logical block diagram of scaling query processing resources for efficient utilization and performance, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of scaling query processing resources for efficient utilization and performance, according to some embodiments are described herein. Queries for data that satisfy various conditions or criteria, insertions, deletions, modifications, or any other request triggering processing based on a request to access a data store may utilize varying amounts of processing resources, including various central processing units (CPUs), graphical processing units (GPUs), or other processing components that may execute various tasks to process database queries, in some embodiments. Because database queries may vary in terms of the workload placed upon the processing resources to execute the database query, the amount of processing resources that any one query engine may provide could be inadequate (or underutilized) to meet the demands of some query workloads.

While database systems that are operated and managed directly by the entities using the database systems may be able to make adjustments to database system configurations for query workloads, cloud service providers and other provider networks that offer database services that operate and manage database systems on behalf of other entities that utilize the database systems may have less insight into the changes in query workload. For instance, many entities that utilize database systems find it desirable to shift operational and management responsibilities to the provider of a database service in order to focus efforts on other tasks. This shift of responsibility to a provider of a database service may cause database services to make management decisions for a database based on unknown information, such as expected query workloads or changes to query workloads.

For example, queries with different scale factors (1 Gigabyte/100 Gigabyte/10 Terabyte) may perform differently for differently sized clusters of computing resources. Queries on 1 Gigabyte (shortest) are faster/same on small sized clusters (e.g., a query processing configuration of 8 computational nodes) as compared to larger sized clusters (e.g., a query processing configuration of 16 computational nodes). While queries on 10 Terabyte (longest) may be fastest on largest (e.g. a query processing configuration of 32 computational nodes) sized clusters as compared to smaller sized clusters (e.g., a query processing configuration of 16 computational nodes). In addition, many queries do not linearly scale with size of clusters.

Selecting query processing resource configurations based on query processing performance alone (which may vary for different reasons as discussed above), may not address concerns for efficient utilization of query processing resources. For example, utilization of query processing resources may be tracked, in some embodiments, in terms of units (e.g., Resource Processing Units (RPUs)) which may, for example, be proportional to a size of a cluster of query processing resources. To achieve the best query performance (e.g., lowest latency), each query could be performed using a selected a best sized cluster for its execution. If these clusters, however, are underutilized, then costs in RPUs not utilized may accrue (e.g., which may be proportional to number and size of clusters allocated).

To address inefficient utilization of query processing resources, techniques to pack (e.g., group) queries together on a same query processing resource configuration (e.g., a same cluster). While packing queries may indeed prevent the waste of computing resources, such techniques may increase query performance variability. This may be occur because of other queries which are running a same resource configuration. For instance, a query may be "packed" on a query processing configuration that uses a 16 node computation cluster or "packed" on a query processing configuration that uses a 32 node computation cluster at other times. If in such scenarios, a query executes in 100 s on the cluster with 16 computational nodes, but was run on the cluster with 32 computational nodes because it was already attached to a database and under-utilized and therefore ran in 150 s, then the query's variability in performance becomes noticeable (e.g., a difference of 50 additional seconds). Therefore, another consideration for selecting query processing resources is that packing should not increase variability beyond some limit.

Techniques for scaling query processing resources for efficient utilization and performance may allow providers of a database services to automatically adapt to query workloads, so that both optimal query performance is achieved (which allows for good client application performance of client applications that utilize the database service) and optimal resource utilization is achieved (which saves computing resources for both clients, indirectly, and providers of database services, directly, to perform other computational tasks).

FIG. 1 illustrates a logical block diagram of scaling query processing resources for efficient utilization and performance, according to some embodiments. Database service 110 may be a stand-alone database service, in various embodiments. For example, database service 110 may be implemented for private use (e.g., on private networks and resources for entity-specific utilization). In some embodiments, database service 110 may be implemented as part of multiple different services provided by a cloud service provider, such as provider network 200 discussed in detail below with regard to FIG. 2.

Database service 110 may manage databases on behalf of clients of database service 110, in various embodiments. For example, database service 110 may implement an interface that allows users to create a database to be hosted in database service 110. The interface may also allow users to specify whether the database is to be managed by the database service, automatically, in a "serverless" fashion (e.g., by allowing database service 110 to automatically determine and configure an appropriate number of computing resources to host and provide access to (e.g., query) the database). In some embodiments, the interface may support management parameters or other information to guide the management of the database, such as a parameter indicating that query performance should be prioritized over resource efficiency (e.g., lower cost), or parameter to indicate that resource efficiency should be prioritized over query performance. In some embodiments, database service 110 may also allow for hosted databases to be manually managed (e.g., via interface requests to configure a specified number of computing resources to host and provide access to (e.g., query) the database).

For database service managed databases, database service 110 may select the query processing configuration to perform a received query (unlike a manually managed database which may use the specified and configured query processing configuration). For example, as illustrated in FIG. 1, a query 102 may be received at database service 110 for a database managed by database service 110. To select the appropriate query processing configuration, database service 110 may implement query response prediction 120 to determine configuration response predictions 122 for many different available processing configurations 160. For example, as discussed in detail below with regard to FIGS. 3, 6, and 7, query response prediction 120 may determine different components of a query response time, such as execution time to perform the query, bootstrap time to prepare query processing resources to execute the query, if any, and queue time for the query to wait before execution at query processing resources, if any. Such components may be determined and combined for each of the different available processing configurations 160.

Available query processing configurations 160 may be any number of different query processing resources (e.g., different sized clusters of computational nodes with different processing and other computing capabilities (e.g., different memory, networking, Input/Output (I/O), etc.)). Available processing configurations 160 may include one or more processing configurations (e.g., one or more clusters) that are already allocated and "attached" to a database. For example, in some embodiments, database service 110 may initially create a "main" or "primary" processing cluster for a database. This cluster may be used to process queries in addition to other processing configurations (e.g., other clusters of different sizes) which may be later attached when selected according to the techniques discussed with regard to FIG. 1. Available processing configurations 160 may include those processing configurations that are not currently attached, but could be attached to the database if selected (e.g., a differently sized compute cluster from a main cluster).

Configuration response predictions 122 determined by query response prediction 120 for each available processing configuration 160 may indicate the query processing configuration that would provide the lowest latency (e.g., fastest) response to query 102, efficient utilization of resources may also be considered as part selecting the processing configuration for the query. Database service 110 may implement response variability tolerance 130 to determine whether or not "packing" using an available processing configuration 160 may exceed a variability threshold for query 102. As discussed in detail below with regard to FIGS. 3, 6 and 7, a variability threshold may be determined specific to query 102. In some embodiments, variability thresholds may be adjusted based on management parameters provided via an interface (e.g., prioritizing query performance or resource efficiency).

As indicated at 132, filtered configuration response predictions associated with filtered available processing configurations 162 (which do not exceed the variability threshold) may be provided to processing configuration selection 140. Processing configuration selection 140, may choose from amongst the filtered available processing configurations 162, in some embodiments, to select one query processing configuration to perform query 102. For example, a lowest remaining predicted response time may indicate which of the filtered available processing configurations 162 to select. In some embodiments, other considerations may affect the selection of the query processing configuration. For example, as discussed below with regard to FIGS. 3 and 6, a processing resource limit for the database, such as a maximum number of RPUs, may not be exceeded, which may determine whether, for example, a new query processing configuration may be attached to the database (e.g., in addition to other query processing configuration(s) already attached to the database).

As indicated at 142, query 102 may be routed to the selected processing configuration 150, which may access database data 152 to perform 151 query 102. Various different storage and query processing arrangements may be implemented, such as clusters that utilize on-cluster storage (e.g., storing database data 152 on locally attached disk storage), remote data storage (e.g., database data 152 being stored in a separate storage service, as discussed below with regard to FIGS. 2 and 4, and/or a combination of both local and remote storage, as discussed with regard to FIG. 5. Selected processing configuration 150 may then return a query response 104.

Please note that the previous description of a database service is a logical description and thus is not to be construed as limiting as to the implementation of a query processing configurations, a database service, database data, and performance of queries, or portions thereof.

This specification continues with a general description of a provider network that implements multiple different services, including a database service and storage service, which may implement scaling query processing resources for efficient utilization and performance. Then various examples of the database service and storage service, including different components/modules, or arrangements of components/module that may be employed as part of implementing the services are discussed. A number of different methods and techniques to implement scaling query processing resources for efficient utilization and performance are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
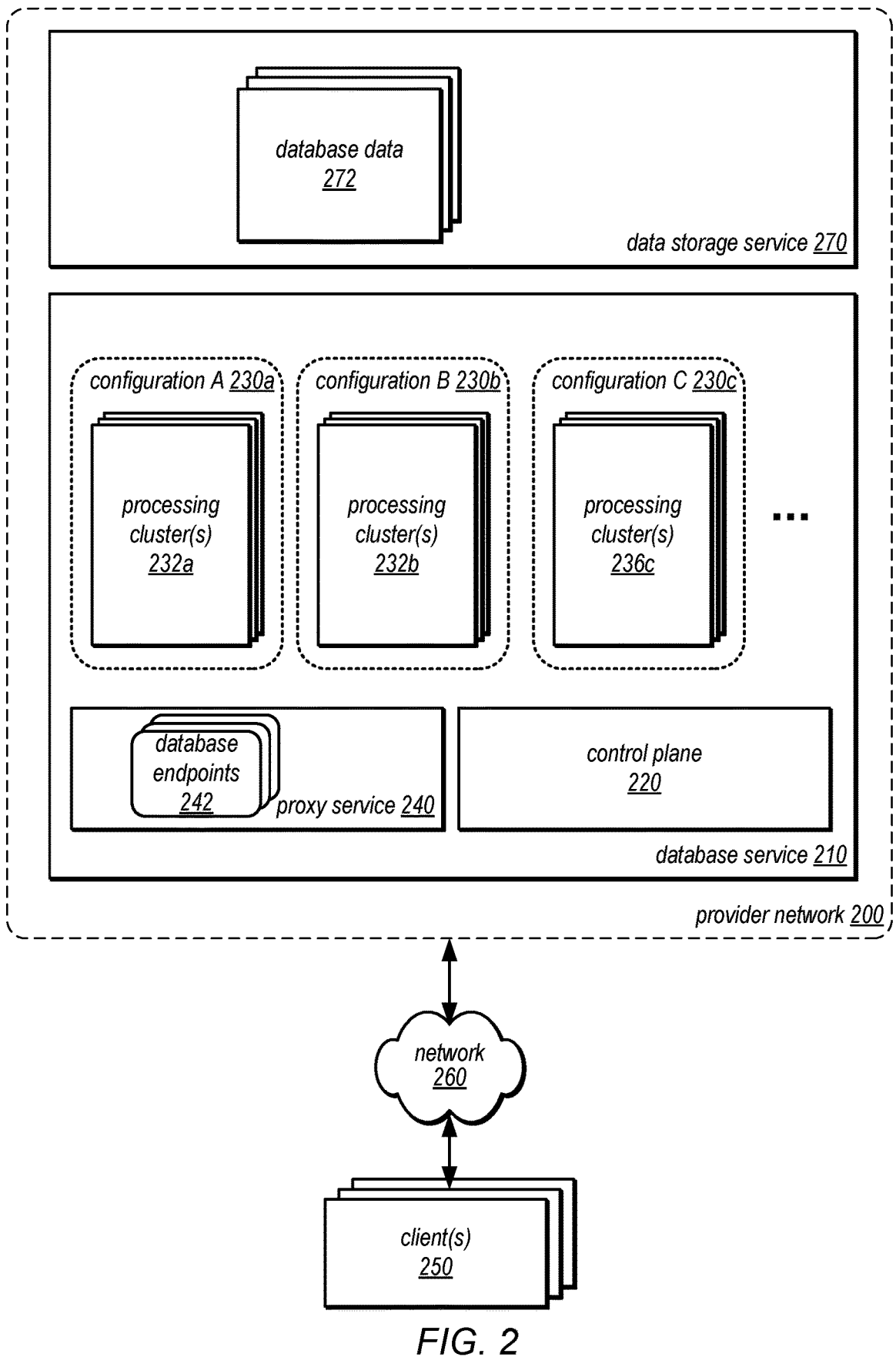
FIG. 2 is a logical block diagram illustrating a provider network offering a database service that scales query processing resources for efficiently utilization performance for databases managed by the database service, according to some embodiments.

FIG. 2 is a logical block diagram illustrating a provider network offering a database service that scales query processing resources for efficiently utilization performance for databases managed by the database service, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be (or included in) various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in database service 210 that is distributed across multiple physical resources, and the resource configurations, such as processing clusters 232, used to process the queries may be scaled up or down on an as needed basis, as discussed in detail below with regard to FIGS. 3-7.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 2210 may be a data warehouse service. Thus in the description that follows database service 210 may be discussed according to the various features or components that may be implemented as part of a data warehouse service, including control plane 220, proxy service 240, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 8. Different subsets of these computing devices may be controlled by control plane 220. Control plane 220, for example, may provide a cluster control interface to clients or users who wish to interact with the processing clusters, such as processing cluster(s) 232a, 232b, and 232c managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

As discussed above, various clients (or customers, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data), as discussed below with regard to FIGS. 3 and 5. For example, multiple users or clients may access a processing cluster to obtain data warehouse services.

For databases manually managed by users, database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 232 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

In at least some embodiments, database service 210 may implement proxy service 240 to provide access to databases (e.g., data warehouses) hosted in database service 210. For databases managed by database service 210, database service 210 may provide database endpoints 242 (e.g., network endpoints) for a hosted database. Database endpoints 242 may not provide direct access to a particular processing cluster 232, as the processing cluster used to respond to such requests (e.g., queries) may change according to the various scaling techniques discussed below with regard to FIGS. 3-7. Instead, client applications may utilize the database endpoint 242 for a database to be included in various client applications or other communications for database access so that proxy service 240 can direct the requests to the appropriate processing cluster without the client application having to be altered every time a change in processing cluster (e.g., scaling operations) are performed by database service 210. In this way, database service 210 can perform scaling and other management operations without interfering with client applications.

Processing clusters, such as processing clusters 232a, 232b, and 232c, hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 23 (or routed/redirect/assigned/allocated to processing cluster(s)) may be directed to local data stored in the processing cluster and/or remote data. Therefore, processing clusters may implement local data processing, such as local data processing, (discussed below with regard to FIG. 5) to plan and execute the performance of queries with respect to local data in the processing cluster, as well as a remote data processing client.

Database service 210 may implement different types or configurations of processing clusters. For example, different configurations A 230a, B 230b, and C 230c, may utilize various different configurations of computing resources, including, but not limited to, different numbers of computational nodes, different processing capabilities (e.g., processor size, power, custom or task-specific hardware, such as hardware optimized to perform different operations, such as regular expression searching, or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "primary cluster." Primary clusters 330 may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster. Control plane 220 may manage cluster pools by managing the size of cluster pools (e.g., by adding or removing processing clusters based on demand).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 250 may encompass any type of client that can submit network-based requests to provider network 200 via network 260, including requests for storage services (e.g., a request to query a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, format independent data processing service 220, and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
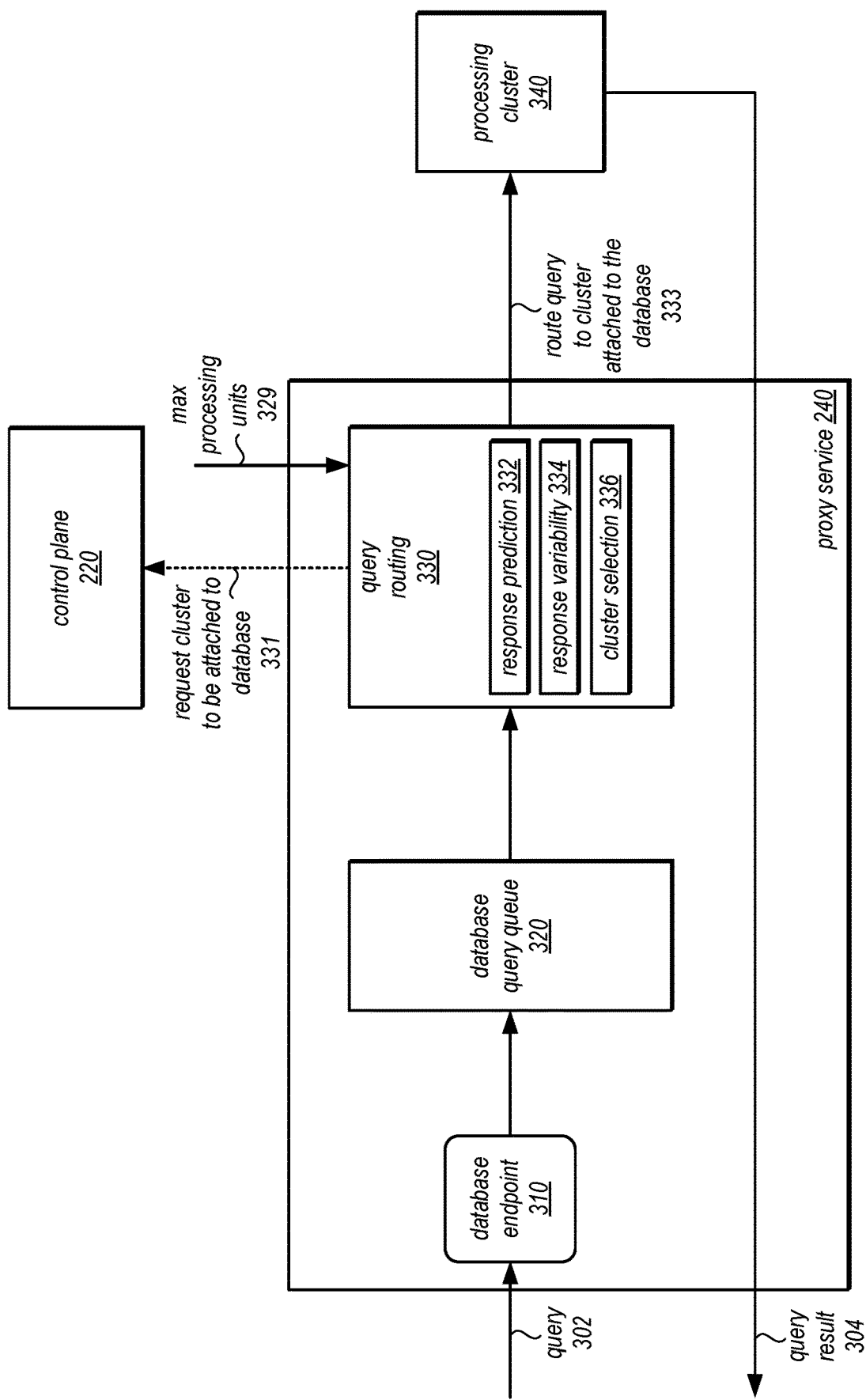
FIG. 3 is a logical block diagram of a proxy service for a database service that routes queries to a selected processing cluster attached to a database managed by the database service, according to some embodiments.

FIG. 3 is a logical block diagram of a proxy service for a database service that routes queries to a selected processing cluster attached to a database managed by the database service, according to some embodiments. As indicated at 302, a query may be received at proxy service 240 via database endpoint 310. For example, query 302 may be sent to a network address or other location specific to a database managed by database service 210. Proxy service 240 may implement one or more components to listen for queries, like query 302, at database endpoint 310.

In various embodiments, proxy service 240 may implement database query queue 320. Database query queue 320 may be a queue of queries directed to a same database, in various embodiments. For example, queries directed to different databases may be received via different database endpoints and put into different respective database query queues (as opposed to being comingled in a common queue). Database query queue 320 may be a database-wide query queue, separate from any workload or other queues implemented on attached processing clusters for the database that are specific to queries routed to the processing cluster to be performed by that processing cluster. Queries, like query 302, may then be pulled from database query queue 320 and routed by query routing 330 (e.g., according to a First In First Out (FIFO) order).

Query routing 330 may implement techniques similar to those discussed above with regard to FIG. 1 and below with regard to FIGS. 4 and 6-7, in order to make routing decisions that scale the processing clusters attached to the database in accordance with optimizing both query performance and processing cluster utilization. For example, as discussed in detail below with regard to FIG. 7, response predictions 332 may be determined for any attached processing clusters as well as another other processing cluster configurations that may be attached (but are not currently attached), based on the execution time, bootstrap time, and queue time. Likewise response variability 334 may be determined enforced using a variability threshold, as discussed below with regard to FIG. 7.

Cluster selection 336 may use response predictions and response variability to make a cluster selection. The following is one example of an algorithm that may be applied by cluster selection 336 in some embodiments. Consider a set of clusters indexed by i ($i \in [1, n+m]$), first n are attached and can be of any size $N_i$, while n+1 to n+m are not attached and are of in possible sizes queries may attach additional 4 compute node or 8 compute node clusters; for a 16 compute node primary cluster, queries may sent to 16 compute node or 32 compute node secondary clusters). For this design consider m=2 considering that at first database service 210 may create only a next power of 2 bigger sized cluster. Now, say response time of a query on a cluster $C_i$ with number of nodes=$N_i$ is
where
   i is index of a cluster
   $R_i$ is the response time of a query on a cluster i
   $B_i$ is the bootstrap time of cluster i and includes burst cluster acquisition and cold start time.
   $E_i$ is the execution time of a query on cluster i
   $Q_i$ is the queue time of a query on cluster i
   $N_i$ is the number of nodes of a cluster i
The objective may be to find a cluster $C_x$ on which a query may execute for best latency, price performance wise, while honoring constraints that a maximum processing units 329 (e.g., specified by via an interface in units such as RPUs) may not be exceeded by the attached processing clusters and variability should not be exceeded.

Thus, the following algorithm may be applied by cluster selection 336:

1. For attachable (but not yet attached) clusters $C_i$ where $i \in [n+1, n+m]$, find execution time $E_i$ for a query q. Recall clusters indexed from n+1 to n+m are different sized clusters which may be attached, if required. For example if m=2, then Cn+1 has 16 compute node cluster and Cn+2 has 32 compute node cluster.
2. Find execution time $E_i$ for a query on these clusters $C_i$. Find minimum execution time $E_{min}$ among all $E_i$ and the corresponding cluster $C_{min}$ with nodes $N_{min}$.
3. Collect all smaller sized clusters $C_i$ than $C_{min}$ in a set $C^-$ for which the query q scales linearly or better as compared to cluster $C_{min}$ on which minimum execution time for query q was noticed, e.g., $E_i/E_{min} \leq N_{min}/N_i$ and Ni<Nmin. For example, if a query takes minimum 5 seconds on a 32 compute node cluster and 10 seconds or 9 seconds on 16 compute node cluster, then keep the 16 compute node cluster for consideration. If a query takes 11 seconds on a 16 compute node cluster, then do not.
4. From $C^-$, find smallest sized cluster $C_{smallest}$. It would be best to execute the query q on this cluster price performance wise. Remove all other clusters from $C^-$
5. Collect in $C^-$ cluster $C_i$ where $i \in [1, n+m]$ on which query can execute such that an increase in response time is no greater than allowed by variability. Therefore $R_i/E_{smallest} \leq (1+V)$.
6. Notice that $C^-$ contains both attached and possible clusters to be attached
7. Choose a cluster $C_{best}$ in $C^-$ with the least response time $R_{best}$. Note that it is possible $R_{best}/E_{smallest} > (1+V)$ if V is not correctly chosen.
8. If $C_{best}$ is attached, then query executes there.
9. If $C_{best}$ is not attached, then attach a new cluster if allowed by MAX
10. If new cluster cannot be attached by MAX, remove all unattached clusters $C_i$, such that $i \in [n+1, n+m)$ in $C^-$ find $C_{best}$ again. Run query on $C_{best}$.

In some embodiments, query routing 330 may also implement other features to monitor performance of cluster selection and, if necessary, disable or modify performance of query routing 330. For example, one feature monitors a query's predicted and real execution time and turn prediction based optimizations off if prediction accuracy is low (e.g., where a query prediction accuracy for a period of time does not satisfy an accuracy criteria). Consider an example where a query's predicted execution time is $E_x$ on a cluster $C_x$. If query runs on this cluster, then the ratio r of query's predicted and real execution time may be considered. An exponential moving average of r may be maintained for each execution time bucket (e.g., range of time). If r breaches a threshold (e.g., >1) for an execution tie bucket, then prediction based rightsizing of clusters may be disabled for the queries which fall in that bucket and instead a same configuration cluster as used as the primary cluster may be used to for the query (if a new cluster is to be attached).

Another feature monitors a query's variability prorated by real execution time. Say a query's predicted minimum execution time is $E_{min}$ on a cluster $C_{min}$. If query executes on another cluster $C_x$, then predicted execution time of query on the r cluster is $E_x$. Say the real execution time of query on $C_x$ is $E_x^r$. Then, proration factor f=EWE, may be determined. Using the proration factor, prorated minimum execution time $E_{min}^p = E_{min} \times f$ may be determined. Next, prorated variability $V^p = E_x^r/E_{min}^p$ may then be determined. An exponential moving average of prorated variability for each execution time bucket may be maintained. If prorated variability exceeds variability target set for each execution time bucket, then prediction based rightsizing of clusters for queries falling in this bucket may be disabled and instead a same configuration cluster as used as the primary cluster may be used to for the query (if a new cluster is to be attached).

Query routing 330 may route the query to an attached cluster to the database 340, as indicated at 333. In some embodiments, a selected cluster is not currently attached to the database. As indicated at 331, if a cluster is selected that is not already attached, then a request cluster to be attached to the database may be sent to control plane 220 in order to have the selected cluster attached.

Although database query queue 320 and query routing 330 are illustrated as implemented as part of proxy service 240, in other embodiments, one or both of these features may be implemented elsewhere. For example, the leader node of the primary cluster attached to a database may implement database query queue 320 and query routing 330 to route queries to an attached cluster (e.g., itself or an different attached cluster).

Figure 4:
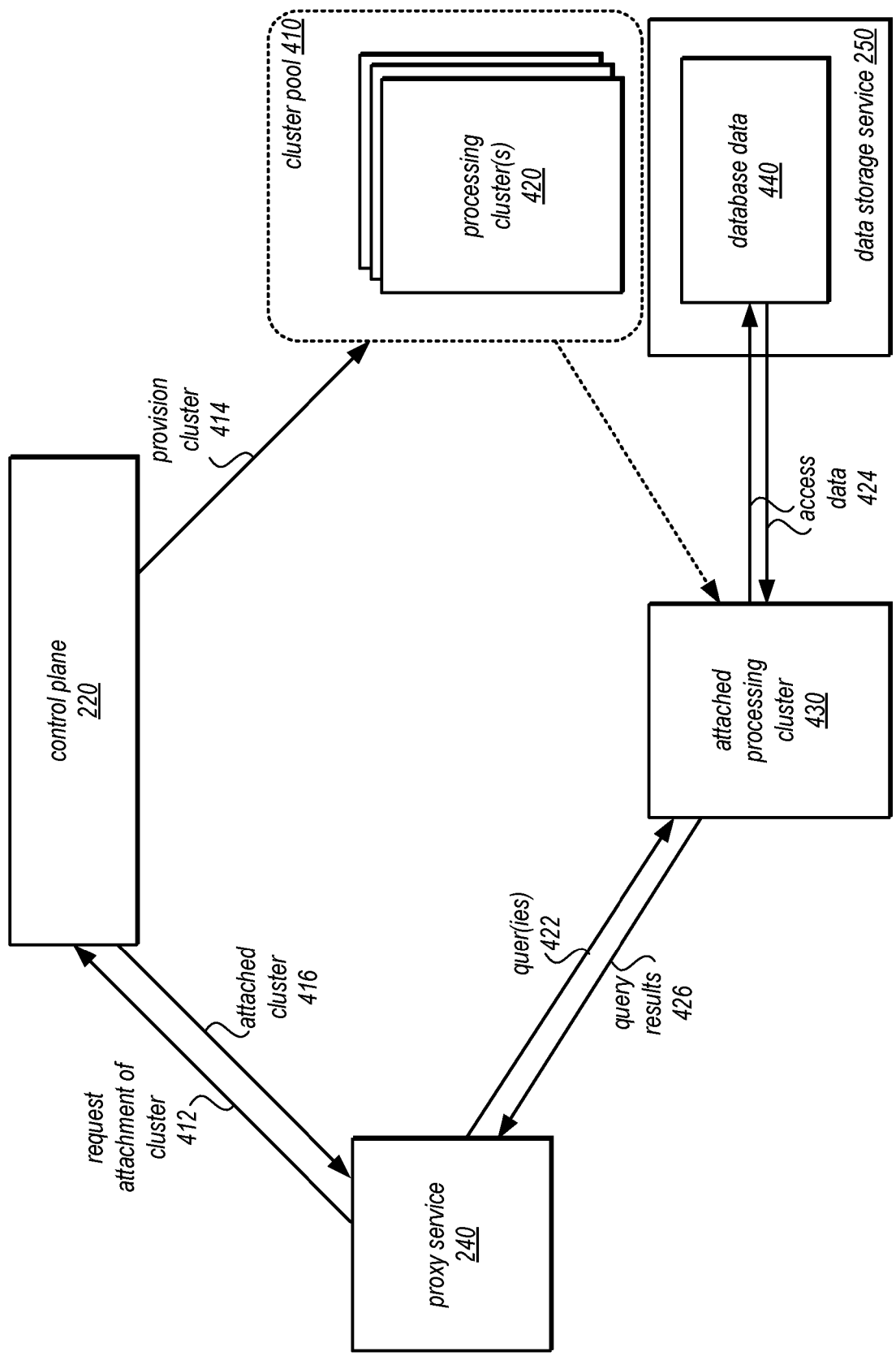
FIG. 4 is a logical block diagram illustrating attaching a new processing cluster selected for a database managed by a database service, according to some embodiments.

FIG. 4 is a logical block diagram illustrating attaching a new processing cluster selected for a database managed by a database service, according to some embodiments. As discussed above, proxy service 240 may detect or determine when to attach a new cluster for performing queries in various scenarios, as discussed above with regard to FIG. 3 and below with regard to FIG. 6. Proxy service 240 may then request an attachment of cluster 412 from control plane 220. The request may, in some embodiments, specify a type of cluster. In some embodiments, control plane 220 may evaluate a manifest, index, or other data that describes available processing cluster(s) 420 in burst cluster pool 410 in order to satisfy the request. For example, control plane 220 may identify a processing cluster that matches the specified configuration of the attach cluster request, in some embodiments. In some embodiments, control plane 220 may identify a burst cluster that was previously used for performing queries to the database.

Control plane 220 may provision 414 the cluster, in some embodiments, from cluster pool, such as attached processing cluster 430. Attaching the cluster may include various operations to configure network connections between processing cluster and proxy service 240 and other services (e.g., data storage service 250). In some embodiments, access credentials, security tokens, and/or encryption keys may be provided so that the newly attached processing cluster 430 can access and database data 440 to perform queries for the database. In some embodiments, initialization procedures, workflows or other operations may be started by control plane 220 at attached processing cluster 430. For example, processing cluster 430 may access 424 metadata from data storage service 250 from database data 440 in order to perform queries to the database. In some embodiments, attached processing cluster 430 may get metadata updates 450 directly from a leader node of an already attached cluster (or other nodes in a primary processing cluster) in order to catch up the metadata to account for changes that occurred after the database data 440 was stored.

Once provisioning is complete, attached processing cluster 430 may be made available for performing queries. Control plane 220 may identify the attached cluster 416 to proxy service 240 (e.g., by providing a network endpoint for processing cluster 430), in some embodiments. Proxy service 240 may then begin directing selected queries 422 to processing cluster 430, which may perform the queries and send back query results 426 to proxy service 240, which may provide the results to a client in turn.

Although not illustrated, when an event that triggers release of the attached cluster occurs, proxy service 230 may send a request to control plane 220 to release the attached cluster 430 (e.g., by including the identifier of the attached processing cluster 430). Control plane 220 may then delete the attached processing cluster 430 (e.g., by removing/deleting data and/or decommissioning/shutting down the host resources for the attached processing cluster 430).

Figure 5:
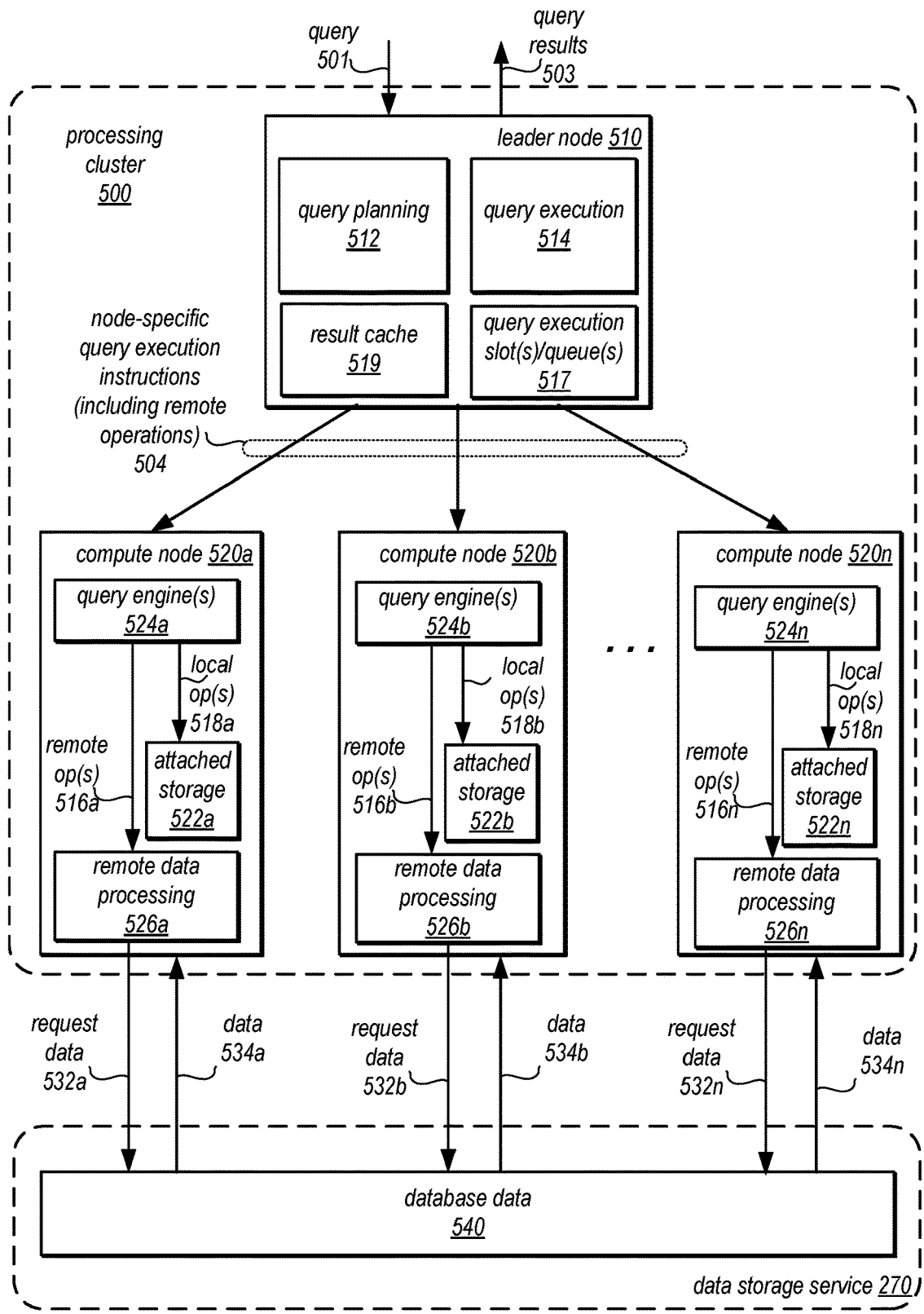
FIG. 5 is a logical block diagram illustrating an example processing cluster of a database service, according to some embodiments.

FIG. 5 is a logical block diagram illustrating an example processing cluster of a database service, according to some embodiments. Processing cluster 500 may be query processing cluster, like processing clusters 232 discussed above with regard to FIG. 2, that distributes execution of a query among multiple computational (which may also be referred to as "compute") nodes. As illustrated in this example, a processing cluster 500 may include a leader node 510 and compute nodes 520a, 520b, and 520n, which may communicate with each other over an interconnect (not illustrated). Leader node 510 may implement query planning 512 to generate query plan(s), query execution 514 for executing queries on processing cluster 500 that perform data processing that can utilize remote query processing resources for remotely stored data (e.g., by utilizing one or more query execution slot(s)/queue(s) 517). As described herein, each node in a primary processing cluster 500 may include attached storage, such as attached storage 522a, 522b, and 522n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

Leader node 510 may manage communications with clients, such as clients 250 discussed above with regard to FIG. 2. As discussed above with regard to FIG. 3, leader node 510 may communicate with proxy service 240 and may receive query 501 and return query results 503 to proxy service 240 (instead of communicating directly with a client application). Alternatively, in those embodiments where leader node 510 implements database query queue 320 and query routing 330 as a primary cluster, then leader node 510 may act as the proxy for other, secondary clusters, attached to the database, and may return query results directly to a client application.

Leader node 510 may be a node that receives a query 501 from various client programs (e.g., applications) and/or subscribers (users) (either directly or routed to leader node 510 from proxy service 240), then parses them and develops an execution plan (e.g., query plan(s)) to carry out the associated database operation(s)). More specifically, leader node 510 may develop the series of steps necessary to obtain results for the query. Query 501 may be directed to data that is stored both locally within processing cluster 500 (e.g., at one or more compute nodes 520) and data stored remotely. Leader node 510 may also manage the communications among compute nodes 520 instructed to carry out database operations for data stored in the processing cluster 500. For example, node-specific query instructions 504 may be generated or compiled code by query execution 514 that is distributed by leader node 510 to various ones of the compute nodes 520 to carry out the steps needed to perform query 501, including executing the code to generate intermediate results of query 501 at individual compute nodes may be sent back to the leader node 510. Leader node 510 may receive data and query responses or results from compute nodes 520 in order to determine a final result 503 for query 501.

A database schema, data format and/or other metadata information for the data stored among the compute nodes, such as the data tables stored in the cluster, may be managed and stored by leader node 510. Query planning 512 may account for remotely stored data by generating node-specific query instructions that include remote operations to be directed by individual compute node(s). Although not illustrated, in some embodiments, a leader node may implement burst manager to send 506 a query plan generated by query planning 512 to be performed at another attached processing cluster and return results 508 received from the burst processing cluster to a client as part of results 503.

In at least some embodiments, a result cache 519 may be implemented as part of leader node 510. For example, as query results are generated, the results may also be stored in result cache 519 (or pointers to storage locations that store the results either in primary processing cluster 500 or in external storage locations), in some embodiments. Result cache 519 may be used instead of other processing cluster capacity, in some embodiments, by recognizing queries which would otherwise be sent to another attached processing cluster to be performed that have results stored in result cache 519. Various caching strategies (e.g., LRU, FIFO, etc.) for result cache 519 may be implemented, in some embodiments. Although not illustrated in FIG. 5, result cache 519 could be stored in other storage systems (e.g., other storage services, such as a NoSQL database) and/or could store sub-query results.

Processing cluster 500 may also include compute nodes, such as compute nodes 520a, 520b, and 520n. Compute nodes 520, may for example, be implemented on servers or other computing devices, such as those described below with regard to computer system 1000 in FIG. 8, and each may include individual query processing "slices" defined, for example, for each core of a server's multi-core processor, one or more query processing engine(s), such as query engine(s) 524a, 524b, and 524n, to execute the instructions 504 or otherwise perform the portions of the query plan assigned to the compute node. Query engine(s) 524 may access a certain memory and disk space in order to process a portion of the workload for a query (or other database operation) that is sent to one or more of the compute nodes 520. Query engine 524 may access attached storage, such as 522a, 522b, and 522n, to perform local operation(s), such as local operations 518a, 518b, and 518n. For example, query engine 524 may scan data in attached storage 522, access indexes, perform joins, semi joins, aggregations, or any other processing operation assigned to the compute node 520.

Query engine 524a may also direct the execution of remote data processing operations, by providing remote operation(s), such as remote operations 516a, 516b, and 516n, to remote data processing clients, such as remote data processing client 526a, 526b, and 526n. Remote data processing clients 526 may be implemented by a client library, plugin, driver or other component that sends request sub-queries to be performed by data storage service 220 or requests to for data, 532a, 532b, and 532n. As noted above, in some embodiments, Remote data processing clients 526 may read, process, or otherwise obtain data 534a, 534b, and 534c, in response from database data 540 in data storage service 270, which may further process, combine, and or include them with results of location operations 518.

Compute nodes 520 may send intermediate results from queries back to leader node 510 for final result generation (e.g., combining, aggregating, modifying, joining, etc.). Remote data processing clients 526 may retry data requests 532 that do not return within a retry threshold.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Although FIGS. 2-5 have been described and illustrated in the context of a provider network implementing a database service, like a data warehousing service, the various components illustrated and described in FIGS. 2-5 may be easily applied to other database services that can utilize scaling query processing resources for efficient utilization and performance. As such, FIGS. 2-5 are not intended to be limiting as to other embodiments of scaling query processing resources for efficient utilization and performance.

Figure 6:
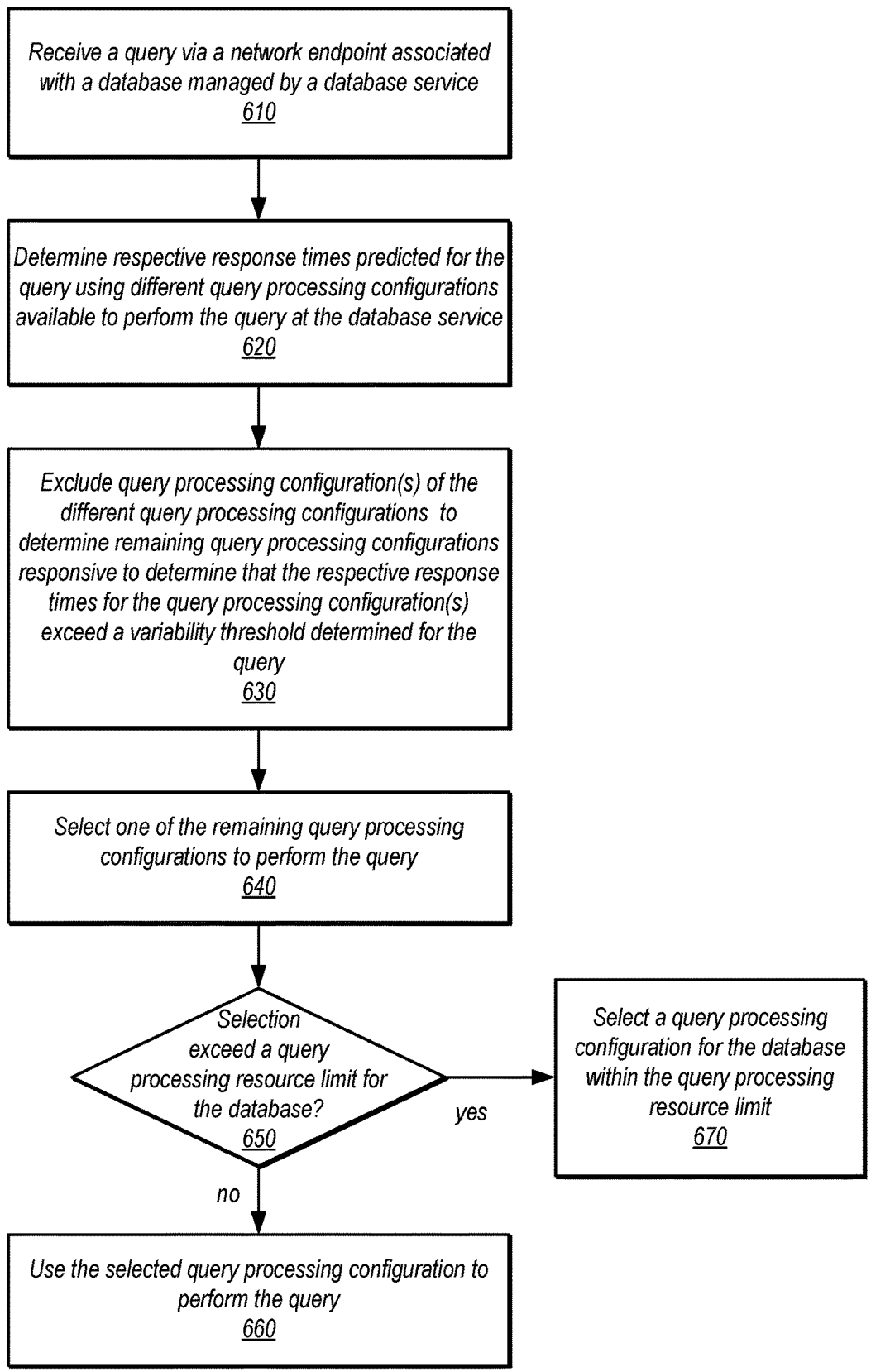
FIG. 6 is a high-level flowchart illustrating methods and techniques to implement scaling query processing resources for efficient utilization and performance, according to some embodiments.

FIG. 6 is a high-level flowchart illustrating methods and techniques to implement scaling query processing resources for efficient utilization and performance, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network and a data set stored in a service of a second provider network). Different types of query engines or non-distributed query performance platforms may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 610, a database query may be received, in various embodiments, via a network endpoint associated with a database managed by a database service. The query may be received according to various interfaces, formats, and/or protocols. For example, the database query may be formatted according to a query language such as Structured Query Language (SQL), in some embodiments, or may be specified according to an Application Programming Interface (API) for receiving queries. In at least some embodiments, the query may be one query of many queries that can be submitted by one or many different users to a same database. For example, the query may compete for computing resources along with other queries received from other users to be executed with respect to a database in some embodiments.

A network endpoint may be a network address or other location for which database service may implement networking resources to listen and obtain the query. By sending the query to the network endpoint, the target of the query, the database, may be identified. In some embodiments, the network endpoint may be provided (e.g., to a user for inclusion in client applications) when the database is created. In at least some embodiments, the database may be created, configured, or modified to be managed by the database service, such that automatic management techniques, including providing a "serverless" management experience for a user of the database is performed. For example, the database may be created without any specified number or other configuration of computing resources used to process queries (or provide other access to) the database. Instead, an initial query processing resource configuration may be automatically selected by the database service for the database, according to various techniques (e.g., using a pre-defined initial query processing resource configuration or using prediction techniques to determine the initial query processing resource configuration based on other information, such as an amount or type of data stored in the database). As noted above with regard to FIG. 1, in some embodiments, management parameters may be included in a request to create the database (or separately as part of other requests) which may be used to guide the selection of query processing resources initially or when later scaling the query processing resources.

As indicated at 620, respective response times may be predicted for the query using different query processing configurations available to perform the query at the database service. For example, both currently attached (e.g., a main or primary processing cluster and any previously attached additional secondary clusters) or able to be attached query processing resource configurations may be considered. Different query processing configurations may include different numbers of computing resources (e.g., different numbers of nodes) with different processing and other computing capabilities (e.g., different memory, networking, Input/Output (I/O), etc.)). As discussed in detail below with regard to 7, different techniques that base response times on execution, queuing, and bootstrapping may be used. In some embodiments, query predictions may be based on query plan cost analysis (e.g., using statistics collected for a database data, such as data distributions in histograms, data cardinality, cost allocations to query plan operations, etc.).

As indicated at 630, query processing configuration(s) of the different query processing configurations may be excluded to determine remaining query processing configurations in response to determinations that the respective response times for the query processing configurations exceed a variability threshold determined for the query, in some embodiments. For example, variability cannot be considered constant for all queries. For short queries, e.g., 100 ms, it may not be possible to achieve even V=100% while for long queries, e.g., 1 hour, V=100% may be too high. Consider the case when attaching a cluster is not constrained by a maximum resource utilization threshold. Also recall that response time may be given by $R_i=B_i+Q_i+E_i$. If a decision is made about scheduling a short query on an existing cluster $C_n$ vis-a-vis creating a new cluster $C_m$ then this choice may only depend on queue time $Q_n$ on cluster $C_n$ and bootstrap time $B_m$ of cluster $C_M$ as $E_n$ and $E_m$ may be both too small to make a difference. Since $Q_n$ and $Q_m$ may be dependent on other factors than queries, bound short query variability may be bound by $B_M/E_m$. This number can be quite large depending on $E_m$. Therefore, variability may be controlled to a smaller number when execution time is greater than both bootstrap time. In some embodiments, the variability threshold may also be adjusted according to whether a performance prioritization parameter or resource utilization prioritization parameter is specified for managing the database.

Variability may be determined in different ways in different scenarios. For example:
1. When $C_{best}$ is not attached, a new cluster may be attached. Then best=smallest and then $R_{best}=E_{smallest}+B_{smallest}$. Substituting this in $R_{best}/E_{smallest} \leq (1+V)$ produces, $V \geq E_{smallest}/E_{smallest}$. Since bootstrap time is a property of a cluster and not query, it may be considered constant, in some embodiments. Therefore, $V > B_{smallest}/E_{smallest}$
2. When $C_{best}$ is attached, and has resources to run a query then variability threshold is trivially met
3. When $C_{best}$ is attached, but is full, then should the query create $C_{smallest}$ or queue on $C_{best}$. In some embodiments, waiting on $C_{best}$ can be chosen only when $Q_{best}+E_{best}<B_{smallest}+E_{smallest}$. Since $E_{best} \geq E_{smallest}$, for a query to wait on $C_{best}$, $Q_{best}<B_{smallest}$. Therefore, for variability bound, the case when a query waits on $C_{best}$ as $Q_{best}/E_{smallest}<B_{smallest}/E_{smallest}$ as may be ignored.

The variability function can be bound by $V > B_{smallest}/E_{smallest}$ if MAX constraint is not violated. Consider then the variability function to be $V=B_{smallest}/E_{smallest}+K$ where K is positive constant for all clusters.

As indicated at 640, one of the remaining query processing configurations may be selected to perform the query, in some embodiments. For example, a best performing query processing configuration may be selected according to smallest response time. The selected query processing configuration may be already attached, in some scenarios. In other scenarios, the query processing configuration may not be attached to the database, and thus may have to be attached.

In some embodiments, a maximum and/or other query processing resource limits may be specified for the database and enforced by the database service. For example, as indicated at 650, a determination may be made as to whether if a query processing resource limit is exceeded by the selection. In some embodiments, a query processing resource limit cannot be exceed if the selected query processing configuration is one already attached to the database. If not attached, then a resource utilization value (e.g., RPUs) for the to be attached query processing configuration (e.g., which may be determined according to a number of nodes and/or capabilities of the nodes in the query processing configuration). If the addition of that resource utilization value causes the total resource utilization value for the database inclusive of already attached query processing resources, then the selection may exceed the query processing resource limit for the database.

If exceeding one (or more) of the query processing resource limit(s), then a query processing configuration for the database may be selected within the query processing resource limit, as indicated at 670 (e.g., selecting add another query processing configuration to attach with a smaller amount of resource utilization or to use an already attached query processing resource). As indicated at 660, if not exceeding the query processing resource limit, then the query may be performed using the selected query processing configuration, in some embodiments.

Figure 7:
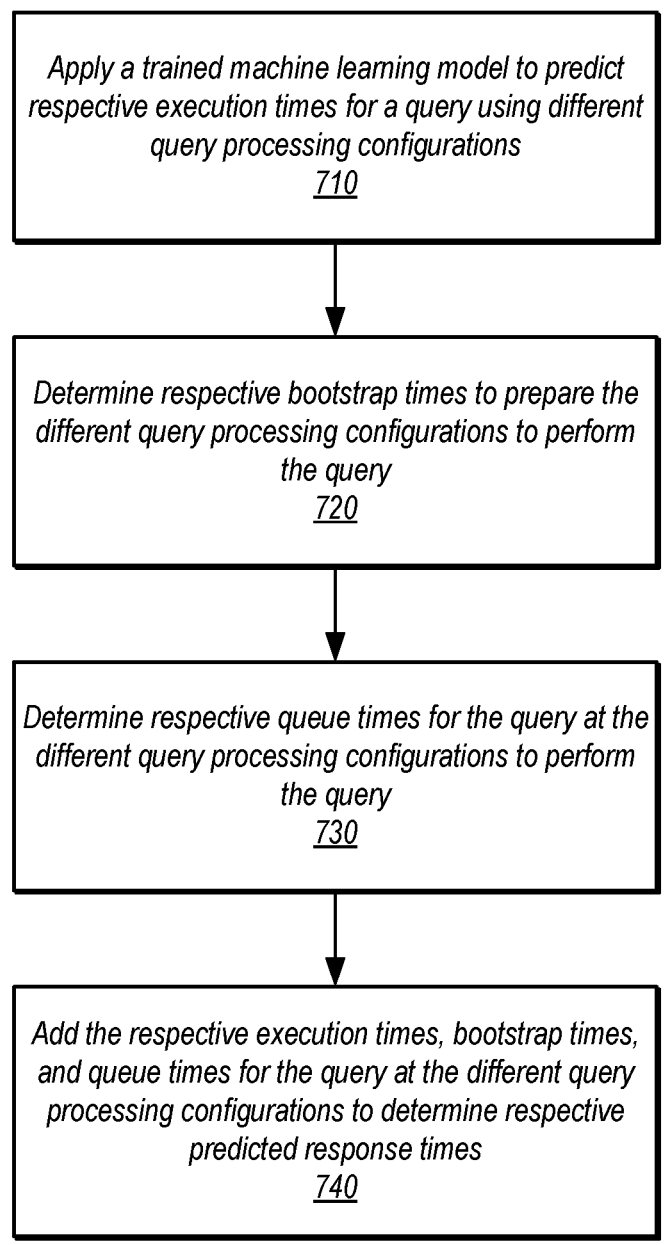
FIG. 7 is a high-level flowchart illustrating methods and techniques to implement predicting response time for queries on different query processing configurations, according to some embodiments.

FIG. 7 is a high-level flowchart illustrating methods and techniques to implement predicting response time for queries on different query processing configurations, according to some embodiments. As indicated at 710, a trained machine learning model may be applied to predict respective execution times for a query using different query processing configurations, in some embodiments. For example, a machine learning model may be trained to accept query plan and a number of nodes (as the query processing configuration) as input features and output a predicted execution time (along with a confidence score). Using this prediction, the best estimated execution time T of a query for a cluster of size n can be determined for various clusters.

As indicated at 720, respective bootstrap times to prepare the different query processing configurations to perform the query may be determined, in some embodiments. For example, in some embodiments, bootstrap time may be determined as: 1) Time to acquire a cluster or 2) Time to prepare the additional cluster to execute queries (e.g., cold start). Cold start may be when a cluster is first attach and downloads data (e.g., block headers) corresponding to a backup version of the database. Thus, in some embodiments, bootstrap time may be $B_n = B_n^{CP} + BD_n^{DP}$ where $B_n^{CP}$ is time taken to acquire a burst cluster with index n. In some embodiments, $BD_n^P$ may be the average time for a cold start. This time may vary from a second to up to several minutes depending on the cluster, but says relatively constant for a cluster. $BD_n^P$ may be started as an average and then updated $BD_n^P$ on the cluster on every restart as an exponential moving average. In some embodiments, the average may be determined as an exponential moving average. A bootstrap time of a query at an attached query processing resource may be zero, in some embodiments.

As indicated at 730, respective queue times for the query at the different query processing configurations may be determined, in some embodiments. Queue time for a query q on a cluster can be estimated by figuring out how long the queries in front q will take to get to execution. To do so, exponential moving average of query queue time ($Q\hat{}Q$) of queries may be tracked normalized by their queue position ($Q\hat{}Q$=queue time/queue position). An example of moving average is $Q\hat{}Q = k \times Q\hat{}+ (1-k) \times last\_querys\_queue\_time$ where $k \in (0, 1)$. Therefore $Q_n$ can be determined by the queue position of q times $Q\hat{}Q$.

As indicated at 740, the respective execution times of a query may be added to the respective bootstrap times and queue times in order to determine respective response times for the query at each of the different query processing configurations.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of scaling query processing resources for efficient utilization and performance as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 8:
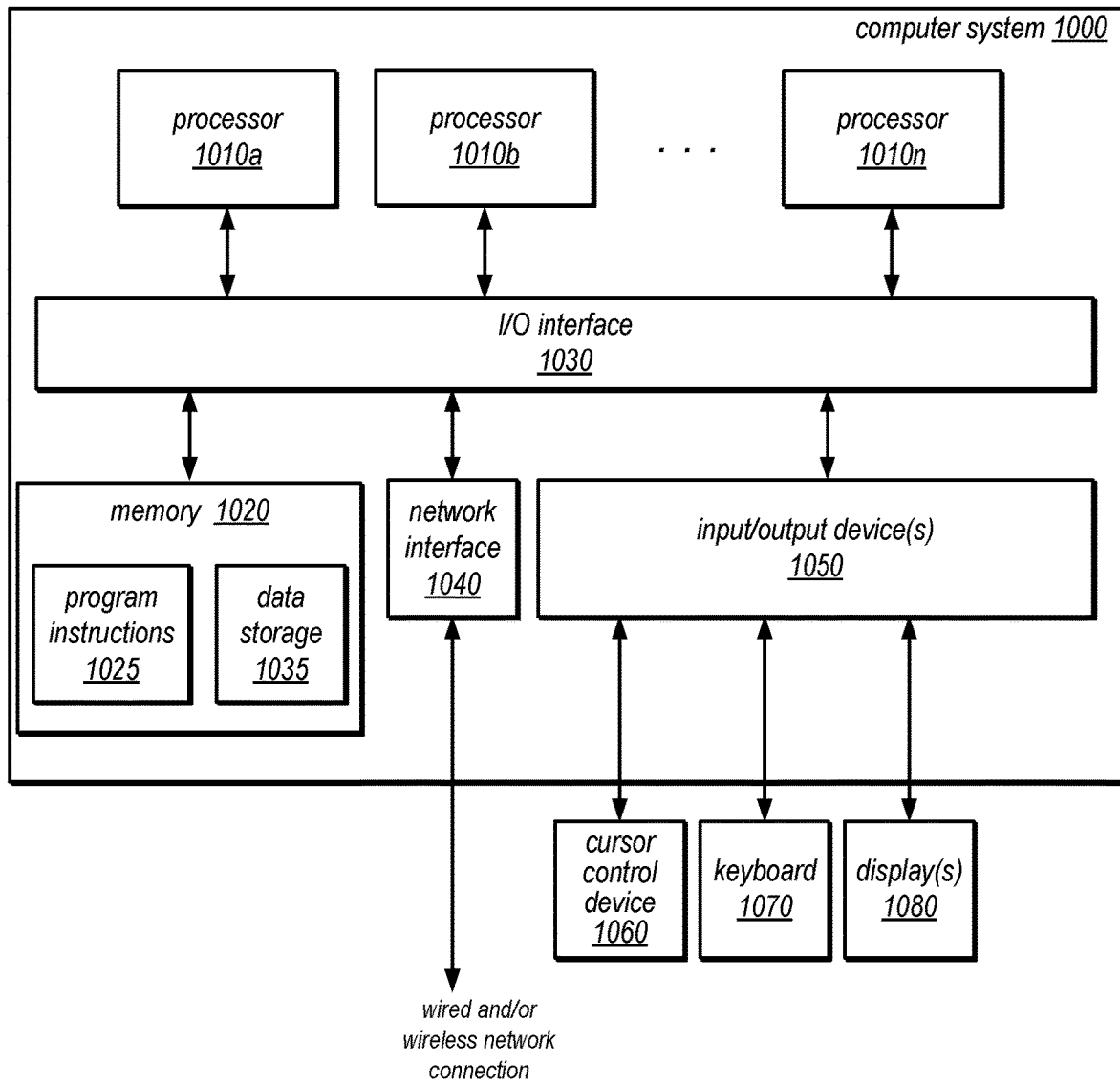
FIG. 8 illustrates an example system that implements the various methods, techniques, and systems described herein, according to some embodiments.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A database service, comprising:
one or more computing devices, respectively comprising a processor and a memory, configured to implement a proxy service for the database service, wherein the proxy service is configured to:
receive a query via a network endpoint associated with a database, wherein the database is managed by the database service, wherein the database was created in response to a request that specified that the database was to be managed by the database service;
determine respective response times predicted for the query using a plurality of query processing configurations available to perform the query at the database service;
determine the respective response times for one or more query processing configurations exceed a variability threshold determined for the query;
exclude the one or more query processing configurations of the plurality of query processing configurations to determine a remaining one or more query processing configurations;
select one of the remaining one or more query processing configurations to perform the query;
route the query to the selected query processing configuration to be performed; and
return a response to the query received from the selected query processing configuration.

2. The system of claim 1, wherein to determine the respective response times predicted for the query using a plurality of query processing configurations available to perform the query at the database service, the proxy service is configured to:
predict respective execution times of the query using the plurality of query processing configurations;
determine respective bootstrap times to prepare the plurality of query processing configurations;
determine respective queue times for the query at the plurality of query processing configurations to perform the query; and
add the respective execution times, bootstrap times, and queue times to determine the respective response times predicted for the query.

3. The system of claim 1, wherein the selected one of the remaining one or more query processing configurations to perform the query is not attached to the database, and wherein the proxy service is further configured to request a control plane of the database service to attach the selected one of the remaining one or more query processing configurations to the database in order to be routed the query for performance.

4. The system of claim 3, wherein the proxy service is further configured to determine that a query processing resource limit for the database is not exceeded by attaching the selected one of the remaining one or more query processing configurations.

5. A method, comprising:
receiving a query via a network endpoint associated with a database managed by a database service;
determining, by the database service, respective response times predicted for the query using a plurality of query processing configurations available to perform the query at the database service;
excluding, by the database service, one or more query processing configurations of the plurality of query processing configurations to determine a remaining one or more query processing configurations responsive to determining the respective response times for the one or more query processing configurations exceed a variability threshold determined for the query; and
selecting, by the database service, one of the remaining one or more query processing configurations to perform the query.

6. The method of claim 5, wherein determining the respective response times predicted for the query using a plurality of query processing configurations available to perform the query at the database service, comprises:
predicting respective execution times of the query using the plurality of query processing configurations;
determining respective bootstrap times to prepare the plurality of query processing configurations;
determining respective queue times for the query at the plurality of query processing configurations to perform the query; and
adding the respective execution times, bootstrap times, and queue times to determine the respective response times predicted for the query.

7. The method of claim 6, wherein predicting respective execution times of the query using the plurality of query processing configurations comprises applying a trained machine learning model that accepts as input a plan to perform the query and a query processing configuration to make the prediction of an execution time for the query processing configuration.

8. The method of claim 5, further comprising:
disabling prediction of response times for subsequent queries responsive to determining that a prediction accuracy for queries fails to satisfy an accuracy criteria.

9. The method of claim 5, further comprising:
disabling prediction of response times for subsequent queries responsive to determining that a prorated variability exceeds a threshold variability target for an execution range of time.

10. The method of claim 5, wherein the selected one of the remaining one or more query processing configurations to perform the query is already attached to the database.

11. The method of claim 5, wherein the selected one of the remaining one or more query processing configurations to perform the query is not attached to the database, and wherein the method further comprises causing the selected one of the remaining one or more query processing configurations to be attached to the database in order to be routed the query for performance.

12. The method of claim 11, further comprising determining that a query processing resource limit for the database is not exceeded by attaching the selected one of the remaining one or more query processing configurations.

13. The method of claim 5, further comprising:
determining that a query processing resource limit for the database is exceeded by attaching the selected one of the remaining one or more query processing configurations; and
selecting a different one of the one or more remaining query processing configurations to perform the query that does not cause the query processing resource limit for the database to be exceeded.

14. One or more non-transitory, computer-readable storage media, storing program instructions that when executed on or across one or more computing devices cause the one or more computing devices to implement a database service that implements:
receiving a query via a network endpoint associated with a database managed by the database service;
determining respective response times predicted for the query using a plurality of query processing configurations available to perform the query at the database service;
determining the respective response times for one or more query processing configurations exceed a variability threshold determined for the query;
excluding the one or more query processing configurations of the plurality of query processing configurations to determine a remaining one or more query processing configurations;
selecting one of the remaining one or more query processing configurations to perform the query; and
causing the query to be performed at the selected query processing configuration.

15. The one or more non-transitory, computer-readable storage media of claim 14, wherein, in determining the respective response times predicted for the query using a plurality of query processing configurations available to perform the query at the database service, the program instructions cause the one or more computing devices to implement:
predicting respective execution times of the query using the plurality of query processing configurations;
determining respective bootstrap times to prepare the plurality of query processing configurations;
determining respective queue times for the query at the plurality of query processing configurations to perform the query; and
adding the respective execution times, bootstrap times, and queue times to determine the respective response times predicted for the query.

16. The one or more non-transitory, computer-readable storage media of claim 14, storing further instructions that when executed on or across the one or more computing devices, cause the one or more computing devices to implement:
disabling prediction of response times for subsequent queries responsive to determining that a prediction accuracy for queries fails to satisfy an accuracy criteria.

17. The one or more non-transitory, computer-readable storage media of claim 14, storing further instructions that when executed on or across the one or more computing devices, cause the one or more computing devices to implement:
disabling prediction of response times for subsequent queries responsive to determining that a prorated variability exceeds a threshold variability target for an execution range of time.

18. The one or more non-transitory, computer-readable storage media of claim 14, wherein the selected one of the remaining one or more query processing configurations to perform the query is not attached to the database, and wherein the one or more non-transitory, computer-readable storage media store further instructions that when executed on or across the one or more computing devices, cause the one or more computing devices to implement causing the selected one of the remaining one or more query processing configurations to be attached to the database in order to be routed the query for performance.

19. The one or more non-transitory, computer-readable storage media of claim 18, storing further instructions that when executed on or across the one or more computing devices, cause the one or more computing devices to implement determining that a query processing resource limit for the database is not exceeded by attaching the selected one of the remaining one or more query processing configurations.

20. The one or more non-transitory, computer-readable storage media of claim 14, wherein the database was created in response to a request that specified that the database was to be managed by the database service.

* * * * *